United States Patent
Thörn et al.

(10) Patent No.: US 10,616,533 B2
(45) Date of Patent: Apr. 7, 2020

(54) SURVEILLANCE SYSTEM AND METHOD FOR CAMERA-BASED SURVEILLANCE

(71) Applicant: Sony Corporation, Tokyo (JP)

(72) Inventors: Ola Thörn, Limhamn (SE); Oskar Syrén, Vellinge (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/094,124

(22) PCT Filed: May 9, 2016

(86) PCT No.: PCT/EP2016/060265
§ 371 (c)(1),
(2) Date: Oct. 16, 2018

(87) PCT Pub. No.: WO2017/194078
PCT Pub. Date: Nov. 16, 2017

(65) Prior Publication Data
US 2019/0141294 A1    May 9, 2019

(51) Int. Cl.
*H04N 7/18* (2006.01)
*G06K 9/00* (2006.01)
(52) U.S. Cl.
CPC ......... *H04N 7/183* (2013.01); *G06K 9/00228* (2013.01); *G06K 9/00369* (2013.01)
(58) Field of Classification Search
USPC .................................................. 348/143, 156
See application file for complete search history.

(56) References Cited

U.S. PATENT DOCUMENTS

| 5,835,616 A | 11/1998 | Lobo et al. |
| 5,991,429 A | 11/1999 | Coffin et al. |

(Continued)

FOREIGN PATENT DOCUMENTS

| AU | 2011101355 | 12/2011 |
| WO | 2015130744 | 9/2015 |
| WO | 2016044442 | 3/2016 |

OTHER PUBLICATIONS

International Search Report and Written Opinion corresponding to International Patent Application No. PCT/EP2016/060265 dated Nov. 17, 2016 (8 pages).

(Continued)

*Primary Examiner* — Nigar Chowdhury
(74) *Attorney, Agent, or Firm* — Myers Bigel, P.A.

(57) ABSTRACT

A camera-based surveillance system operates to detect presence of unauthorized individuals in digital images taken by a camera unit at a venue visited by individuals that are either authorized or unauthorized. A control unit in the surveillance system obtains, from a positioning system, a position parameter for each authorized individual located at the venue, processes each digital image for detection of one or more individuals, and detects presence of one or more unauthorized individuals in the digital image as a function of the individual(s) detected in the digital image and the position parameter(s) for the one or more authorized individuals. The positioning system may comprise a base station for receiving authorized data transmissions generated by wireless communication devices located at said venue, and a positioning module for determining the position parameter of the respective communication device with respect to the base station based on a respective authorized data transmission.

17 Claims, 4 Drawing Sheets

(56) References Cited

U.S. PATENT DOCUMENTS

| | | | |
|---|---|---|---|
| 7,139,411 B2 | 11/2006 | Fujimura et al. | |
| 8,131,011 B2 | 3/2012 | Nevatia et al. | |
| 8,634,601 B2 | 1/2014 | Bedros et al. | |
| 10,313,638 B1* | 6/2019 | Yeturu | H04N 7/185 |
| 2003/0107484 A1* | 6/2003 | Gagnon | G08B 13/19632 340/552 |
| 2004/0224700 A1* | 11/2004 | Sawano | G06F 16/58 455/456.1 |
| 2004/0228503 A1* | 11/2004 | Cutler | G06K 9/00348 382/103 |
| 2006/0059557 A1* | 3/2006 | Markham | G07C 9/00158 726/22 |
| 2006/0064477 A1* | 3/2006 | Renkis | G08B 13/19615 709/223 |
| 2007/0291985 A1 | 12/2007 | Krahnstoever et al. | |
| 2008/0170120 A1* | 7/2008 | Senior | H04N 7/183 348/143 |
| 2009/0041297 A1 | 2/2009 | Zhang et al. | |
| 2010/0167758 A1* | 7/2010 | Mukai | H04W 64/00 455/456.2 |
| 2011/0211563 A1* | 9/2011 | Herrala | G01S 1/68 370/338 |
| 2014/0132763 A1* | 5/2014 | Billau | H04N 7/162 348/143 |
| 2014/0133831 A1* | 5/2014 | Billau | H04N 5/76 386/262 |
| 2014/0240581 A1* | 8/2014 | Sung | H04N 5/2251 348/335 |
| 2014/0288811 A1* | 9/2014 | Oura | G08G 1/0116 701/119 |
| 2014/0340576 A1* | 11/2014 | Kim | H01Q 1/00 348/375 |
| 2014/0375454 A1 | 12/2014 | Konrad et al. | |

OTHER PUBLICATIONS

Benabdelkader et al. "Gait Recognition Using Image Self-Similarity" EURASIP Journal on Applied Signal Processing 4:572-585 (2004).

Dahlgren et al. "Evaluation of indoor positioning based on Bluetooth® Smart technology" Master of Science Thesis in the Programme Computer System and Networks, Chalmers University of Technology, 94 pages (2014).

Ramírez "Time-of-flight in Wireless Networks as Information Source for Positioning" Dissertation, Technische Universität München, 161 pages, (2011).

Schiele et al. "Visual People Detection—Different Models, Comparison and Discussion" Proceeding of the IEEE ICRA 2009, 8 pages (2009).

Moeslund et al. "A Survey of Computer Vision-based Human Motion Capture" Computer Vision and Image Understanding 81:231-268 (2001).

* cited by examiner

SURVEILLANCE SYSTEM AND METHOD FOR CAMERA-BASED SURVEILLANCE

CROSS REFERENCE TO RELATED APPLICATIONS

This application is a 35 U.S.C. § 371 national stage application of PCT International Application No. PCT/EP2016/060265, filed on May 9, 2016, the contents of which are incorporated herein by reference in its entirety. The above-referenced PCT International Application was published in the English language as International Publication No. WO 2017/194078 A1 on Nov. 16, 2017.

TECHNICAL FIELD

The present invention relates generally to camera-based surveillance and in particular to systems and methods for detecting unauthorized individuals in digital images of a scene.

BACKGROUND ART

Camera-based surveillance has gained immense popularity because of rising concerns for security and safety. Surveillance cameras are typically video cameras, often denoted CCTV (Closed-circuit television) cameras, which are used for the purpose of observing an area or scene. The cameras are often connected to a recording device or IP network, and the images generated by the cameras may be displayed for observation by a security guard or law enforcement officer.

As surveillance cameras are gaining in popularity, it has become important to reduce the need for human personnel to monitor camera footage. To this end, automatic surveillance systems have been developed to apply advanced computer vision techniques to analyze digital images generated by surveillance cameras for the purpose of identifying, tracking and categorizing objects in the field of view, either in real time or in retrospect. One challenge in this context is that surveillance cameras generate massive amounts of data which need to be processed automatically.

Automatic surveillance systems may analyze the digital images provided by surveillance cameras by facial recognition algorithms, for the purpose of identifying or verifying individuals in the digital images. A large number of facial recognition algorithms are known in the art, e.g. as disclosed in U.S. Pat. Nos. 5,835,616, 5,991,429 and 8,634,601. However, facial recognition algorithms are processing intensive and require the digital images to be of good quality, with respect to image resolution, lighting conditions, image noise, etc. Further, facial recognition may be rendered difficult if shadows are cast on the face of the individual to be monitored, or if the individual partly or wholly conceals the face by turning it away from the camera, by wearing headdress or sunglasses, adding or removing facial hair, etc.

It is also known to analyze the walking style, also known as "gait", of individuals for the purpose of surveillance, e.g. by use of the algorithms presented in the article "Gait recognition using image self-similarity", by BenAbdelkader et al, published in EURASIP Journal on Applied Signal Processing, pages 572-585, 2004. A surveillance system that processes images by a combination of facial recognition and gait analysis is known from AU2011101355.

Automatic surveillance systems may also apply so-called Video Content Analysis (VCA) to analyze video, i.e. a time sequence of images, to detect and determine temporal events not based on a single image. A surveillance system using VCA may e.g. detect non-normal behavior of individuals. For example, the system can be set to detect anomalies in a crowd, for instance a person moving in the opposite direction in airports where passengers are only supposed to walk in one direction out of a plane or in a subway where people are not supposed to exit through the entrances.

A specific application of surveillance systems is to monitor a venue for detection of unauthorized individuals, i.e. individuals that have not been approved to access the venue. The venue may be a building, and the surveillance cameras may be installed at entrance points, in enhanced-security areas, or even throughout such a building. This type of surveillance system may use any of the above-mentioned computer vision techniques to detect and track unauthorized individuals. However, the computer vision techniques of the prior art generally have a low ability to properly discriminate between individuals and are likely to generate a high number of false positives, making them less suited or even ineffective for this type of surveillance.

BRIEF SUMMARY

It is an objective of the invention to at least partly overcome one or more limitations of the prior art.

Another objective is to provide a camera-based surveillance technique capable of detecting presence of unauthorized individuals at a venue, and preferably to discriminate between authorized and unauthorized individuals.

A further objective is to provide such a camera-based surveillance technique with relatively low requirements on image quality.

A yet further objective is to provide such a camera-based surveillance technique that is processing efficient and allows for fast detection of unauthorized individuals.

One or more of these objectives, as well as further objectives that may appear from the description below, are at least partly achieved by a surveillance system, a computer-implemented method for camera-based surveillance, a computer-readable medium, a control device, and a surveillance system according to the independent claims, embodiments thereof being defined by the dependent claims.

A first aspect of the invention is a surveillance system. The surveillance system comprises a camera unit configured to generate a digital image of a scene at a venue visited by individuals that are either authorized or unauthorized, the authorized individuals having a respective communication device configured to send authorized data transmissions. The surveillance system further comprises a base station configured to receive data transmissions generated by communication devices located at said venue, said data transmissions including the authorized data transmissions, a positioning module configured to determine a position parameter of the respective communication device with respect to the base station based on a respective authorized data transmission, an image processing module configured to process the digital image for detection of one or more individuals in the digital image, and a surveillance module configured to detect presence of one or more unauthorized individuals in the digital image as a function of said one or more individuals detected by the image processing module and the or each position parameter determined by the positioning module.

Embodiments of the invention are based on the insight that it is possible to improve or simplify the task of detecting unauthorized individuals by computer vision analysis of digital images from a surveillance camera at a venue, by using location data about the authorized individuals at the venue. Such location data may be provided by any known positioning system, e.g. a conventional indoor or outdoor positioning system. The location data may take may different forms, but should at least inform the surveillance system about the presence of one or more authorized individuals within the scene monitored by the surveillance camera. The location data may also allow the surveillance system to infer the number of authorized individuals within the scene and, possibly, the location of the respective authorized individual within the scene. It is realized that such information about authorized individuals in the scene may generally facilitate the task of analyzing the digital image for presence of unauthorized individuals. This may translate into reduced requirement on image quality, reduced need for processing power, and increased speed of detection. For example, the image quality need only be sufficient to detect individuals in the image, in contrast to the need for high-quality images when applying advanced computer vision techniques to identify a priori unknown individuals in images. Also, simpler and more processing efficient algorithms may be applied to merely detect individuals in the images compared to identifying unknown individuals.

According to the first aspect, the positioning system is implemented by a combination of communication devices and at least one base station which is configured to receive data transmissions generated by the communication devices. The communication devices are provided to and carried by the authorized individuals at the venue. For example, the communication devices may be mobile phones or any wearable devices capable of wireless data transmission. Each authorized person is provided with a communication device capable of sending authorized data transmissions, i.e. data transmissions that can be verified to originate from a communication device belonging to an authorized individual. The surveillance system comprises a positioning module which determines, based on an authorized data transmission from a communication device, a position parameter of the communication device in relation to the base station. The position parameter corresponds to the above-mentioned location data. It should be noted that the surveillance system is only responsive to communication devices capable of sending authorized data transmissions. Thus, even if an unauthorized individual has a communication device capable of sending data transmissions which are received by the base station, the positioning module will only determine the position parameter for authorized data transmissions and will ignore all other data transmissions.

In one embodiment, the surveillance module is configured to determine, based on the or each position parameter, a first count of authorized individuals located in the scene, determine a second count of said one or more individuals detected in the digital image, and compare the first and second counts so as to detect the presence of the one or more unauthorized individuals in the digital image. Here, the surveillance module may be configured to detect the presence of one or more unauthorized individuals in the digital image if the second count exceeds the first count.

In one embodiment, the surveillance module is further configured to, based on the or each position parameter, discriminate said one or more individuals detected in the digital image into authorized and unauthorized individuals.

In one embodiment, the or each position parameter comprises one or more of: a presence of the respective communication device within the scene, a distance from the base station to the respective communication device within the scene, and a direction from the base station to the communication device.

In one embodiment, the base station is configured for wireless short-range communication, such as Bluetooth or Wi-Fi communication.

In one embodiment, the base station is configured to only receive data transmissions generated by communication devices located within the scene.

In one embodiment, the base station is located in proximity of the camera unit.

In one embodiment, the base station comprises a directional antenna which is configured with a radiation lobe that is substantially equal to and overlaps a field of view of the camera unit.

In one embodiment, the positioning module is configured to process said data transmissions to identify the authorized data transmissions. The positioning module may be configured to identify the authorized data transmissions by extracting, from the data transmissions, a device identifier uniquely associated with the respective communication device, and comparing the device identifier with a reference identifier.

In one embodiment, the camera unit, the base station, the positioning module and the image processing module are combined into a unitary device. Further, the surveillance module may be combined with the unitary device.

In one embodiment, the surveillance module is further configured to, when detecting the presence of one or more unauthorized individuals in the digital image, perform a surveillance action. The surveillance action may comprise one or more of: generate a warning signal, insert a graphical indication of each unauthorized individual in the digital image and provide the digital image for display and/or storage, store the digital image, start a tracking function to generate a respective movement path within at least part of the venue for said one or more unauthorized individuals, generate a first control signal for controlling motion of the camera unit so as to follow movement of said one or more unauthorized individuals, and generate a second control signal for controlling the camera unit to zoom in on said one or more unauthorized individuals.

A second aspect of the invention is a computer-implemented method for camera-based surveillance. The method comprises receiving, from a camera unit, a digital image of a scene at a venue visited by individuals that are either authorized or unauthorized; obtaining, from a positioning system, a respective position parameter for one or more authorized individuals located at the venue; processing the digital image for detection of one or more individuals in the digital image; and detecting presence of one or more unauthorized individuals in the digital image as a function of said one or more individuals detected in the digital image and the or each position parameter for the one or more authorized individuals.

In one embodiment of the second aspect, the authorized individuals have a respective communication device configured to send authorized data transmissions, and the step of obtaining a respective position parameter comprises: receiving data transmissions generated by communication devices located at said venue, said data transmissions including the authorized data transmissions, and determining the respective position parameter based on a respective authorized data transmission.

In one embodiment, the method further comprises: determining, based on the or each position parameter, a first count of authorized individuals located in the scene, determining a second count of said one or more individuals detected in the digital image, and comparing the first and second counts so as to detect the presence of the one or more unauthorized individuals in the digital image. Here, the method may detect the presence of one or more unauthorized individuals in the digital image if the second count exceeds the first count.

In one embodiment, the method further comprises discriminating, based on the or each position parameter, said one or more individuals detected in the digital image into authorized and unauthorized individuals.

In one embodiment, the or each position parameter comprises one or more of: a presence of the respective communication device within the scene, a distance from a base station that receives said data transmissions to the respective communication device within the scene, and a direction from the base station to the communication device.

In one embodiment, the base station receives said data transmissions by wireless short-range communication, such as Bluetooth or Wi-Fi communication.

In one embodiment, the base station only receives data transmissions generated by communication devices located within the scene.

In one embodiment, the base station is located in proximity of the camera unit.

In one embodiment, the base station operates to generate a radiation lobe that is substantially equal to and overlaps a field of view of the camera unit.

In one embodiment, the method further comprises the step of processing said data transmissions to identify the authorized data transmissions. The authorized data transmissions may be identified by extracting, from the data transmissions, a device identifier uniquely associated with the respective communication device, and comparing the device identifier with a reference identifier.

In one embodiment, the method further comprises, when detecting the presence of one or more unauthorized individuals in the digital image, perform a surveillance action. The surveillance action may comprise one or more of: generating a warning signal, inserting a graphical indication of each unauthorized individual in the digital image and providing the digital image for display and/or storage, storing the digital image, starting a tracking function to generate a respective movement path within at least part of the venue for said one or more unauthorized individuals, generating a first control signal for controlling motion of the camera unit so as to follow movement of said one or more unauthorized individuals, and generating a second control signal for controlling the camera unit to zoom in on said one or more unauthorized individuals.

In one embodiment, the positioning system is an indoor positioning system and the venue is a building or a part thereof.

A third aspect of the invention is a computer-readable medium comprising computer instructions which, when executed by a processor, cause the processor to perform the method of the second aspect or any of its embodiments.

A fourth aspect is a control unit configured to perform the method of the second aspect, and further comprising a signal interface for receiving the digital image from the camera unit and the position parameter from the positioning system.

A fifth aspect is a surveillance unit, comprising a camera unit configured to generate a digital image of a scene at a venue visited by individuals that are either authorized or unauthorized, an positioning system configured to generate a position parameter for one or more authorized individuals located at the venue, and a control unit according to the fourth aspect.

In one embodiment of the fifth aspect, at least part of the positioning system is integrated with the camera unit into a unitary device.

The second to fifth aspects share the advantages of the first aspect. Any one of the above-identified embodiments of the first aspect may be adapted and implemented as an embodiment of the second to fifth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Before describing embodiments of the invention in more detail, a few definitions will be given.

As used herein, the term "authorized individuals" denotes persons that have been granted access to a venue. All other persons that may enter the venue are denoted "unauthorized individuals". The venue may be any place or site to which persons are granted access rights. The venue may be a building, e.g. a corporate building, a military facility, a government building, or a power plant to which all or certain employees are granted access. In another example, the building is an educational building to which all or certain students and staff are granted access rights. The venue may also be a specific section of a building, e.g. a high-security area of an airport, a corporate building, a hospital, a library, a bank, etc. It also to be understood that while access rights may vary within a venue, the particular scene monitored by a camera unit in the surveillance system is associated with access rights that define the authorized individuals for this particular scene. It is also conceivable that the venue (and the scene) is located outdoors, e.g. a outdoor area at any of the above-mentioned buildings, or at any other outdoor location with restricted access, such as a military area or an airport area.

As used herein, "scene" denotes the three-dimensional space seen by a camera unit. A camera unit is configured to produce digital still images or digital video, i.e. a coherent time-sequence of digital images. The camera unit may comprise imaging optics, a digital image sensor, and control electronics for acquiring signals from the digital image sensor and generating a digital image, which may be monochromatic or polychromatic.

As used herein, a "base station" (BS) is any device capable of receiving a wireless data transmission ("signal receiver"). A base station may also be capable of sending a wireless data transmission ("signal transceiver"). The base station includes one or more antennas for interception of radio waves and conversion of the radio waves into electric currents. The base station further comprises electronic circuitry for converting the electric currents into a digital signal. The base station may also translate the digital signal into sets of information based on a predefined communication protocol.

As used herein, "wireless short-range communication" denotes any technique for wireless data transmission across a range of about 5-100 meters, including but not limited to Bluetooth™, IEEE 802.11 (also known as Wi-Fi), IEEE 802.15.4, RFID, UWB, ZigBee and Z-wave.

As used herein, an "indoor positioning system" (IPS) is any system configured to locate objects or people inside a building using radio waves, magnetic fields, acoustic signals, or other sensory information. Various indoor positioning systems based on radio waves are further described in "Evaluation of indoor positioning based on Bluetooth™ Smart technology", Master of Science Thesis in Programmatic Computer Systems and Networks, by Dahlgren and Mahmood, Chalmers University of Technology, 2014, and "Time-of-flight in Wireless Networks as Information Source for Positioning", by Ramirez, Technische Universität München, 2011, which are both incorporated herein by reference in their entirety.

Embodiments of the invention are directed to various aspects of a camera-based surveillance system that combines computer vision analysis of digital images captured by a camera unit with location data obtained from an indoor positioning system, for the purpose of detecting the presence and, optionally, the location of unauthorized persons in the digital images.

Figure 1:
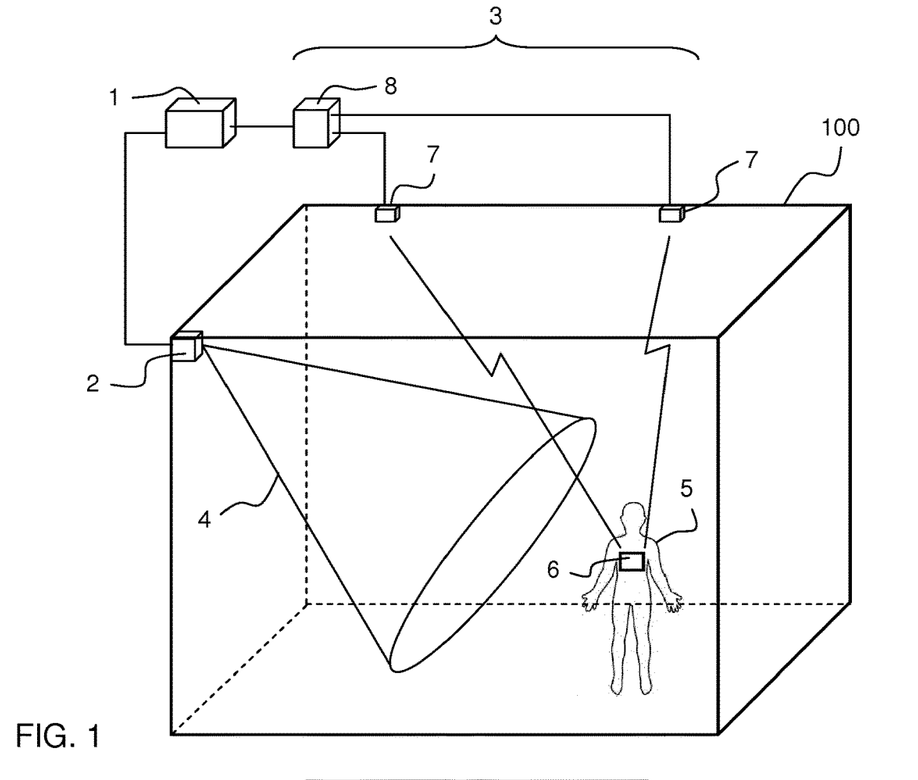
FIG. 1 is a perspective view of an installation of a surveillance system in a room.

An embodiment of the invention will be exemplified with reference to FIG. 1, which illustrates a surveillance system installed in a room 100 within a building (not shown). The room 2 is visited by individuals that are either authorized or unauthorized, and the surveillance system is configured to detect the presence of unauthorized individuals. The surveillance system comprises a control unit 1 with a signal interface which is connected to a camera unit 2, denoted "surveillance camera" or "camera" in the following, and an indoor positioning system 3, denoted "IPS" in the following. The signal interface may be of any type for wired or wireless transfer of data. The camera 2 is mounted such that its field of view 4 defines a scene within the room 100. The camera 2 is operable to generate digital images of the scene and provide the images to the control unit 1. The IPS 3 is configured to generate a position parameter for each authorized individual 5 within the building, or at least within the scene. The position parameter is supplied to the control unit 1. It is presumed herein that the IPS 3 is configured to only generate position parameters for authorized individuals.

In the illustrated example, the IPS 3 comprises one mobile communication device 6 ("mobile device", MD) for each authorized individual, a set of fixedly mounted base stations (BSs) 7 which communicate wirelessly with the MDs 6, and a positioning module 8 that obtains and supplies the position parameters for the authorized individuals 5 to the control unit 1. The MDs 6 are carried by the authorized individuals 5 and are thus moved around with the respective individual 5. The MD 6 may be a generic device with a dedicated software program that operates the generic device to enable positioning. Such a generic MD 6 may be a mobile phone, or any type of wearable device enabled for wireless communication, such as an electronic watch, a headset, a media player, electronic glasses, electronic textile, an activity tracker, etc. Alternatively, the MD 6 may be a dedicated device provided exclusively for use with the IPS 3.

Depending on implementation, the position parameter may be computed locally by the respective MD 6, based on signals received by the MD 6 from the BSs 7, or globally by the positioning module 8, based on signals received by the BSs 7 from the respective MD 6. If the position parameter is computed locally, the respective MD 6 is controlled to transfer the position parameter to the positioning module 8, e.g. by data transfer to one of the BSs 7.

The IPS 3 may be a generic system installed in the building primarily for other purposes than surveillance, such as navigation, advertising, augmented reality, etc. Such a generic IPS 3 typically generates the position parameter in the form of spatial coordinates in a two- or three-dimensional Cartesian coordinate system with a predefined location in relation to the building. This type of coordinates is denoted "building coordinates" in the following.

Alternatively, the IPS 3 may be tailored for use in the surveillance system. Such a tailored IPS 3 may also generate the position parameter in the form of building coordinates. However, as will be exemplified further below with reference to FIGS. 5-6, it may be advantageous for the IPS 3 to generate each position parameter to directly represent the location of the MD 6 with respect to the respective base station 7, e.g. a distance between the MD 6 and the base station 7, or a direction between the MD 6 and the base station 7. In a further example, the position parameter is generated to merely indicate presence of the MD 6 within a zone or cell that corresponds to the scene monitored by the camera 2.

Figure 2:
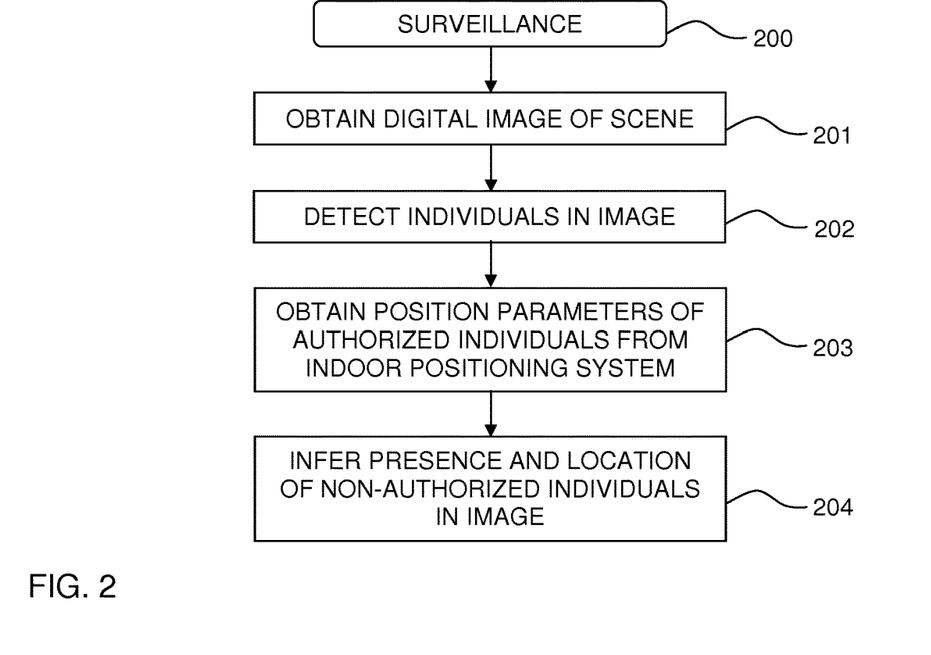
FIG. 2 is a flow chart of a method in the surveillance system in FIG. 1.

The operation of the surveillance system in FIG. 1 will be exemplified with reference to FIG. 2, which is a flow chart of a surveillance method 200 executed by the control unit 1. The method may be implemented by software instructions running on a processing device, such as a microprocessor, microcontroller, DSP, etc, in the control unit 1. The software instructions may be supplied on a computer-readable medium for execution by the processing device in conjunction with an electronic memory in the signal generator 11. The computer-readable medium may be non-transitory, e.g. a tangible product such as a magnetic medium, an optical disk, a read-only memory, a flash memory, etc, or transitory, such as a propagating signal.

The method involves a step 201 of obtaining a current image of the scene. The current image may be taken from a stream of digital images produced by the camera 2, or the camera 2 may be actively commanded to capture and supply the current image. In step 202, the current image is processed for detection of individuals, using any available detection algorithm or combination of detection algorithms. It should be noted that step 202 may utilize information from preceding and/or subsequent images to detect the individuals in the current image. Many suitable detection algorithms are known in the art, and non-limiting examples are given in the articles "Visible People Detection—Different Models, Comparison and Discussion" by Schiele et al, published in Proceedings of the IEEE ICRA, 2009, and "A Survey of Computer Vision-Based Human Motion Capture", by Moeslund and Granum, published in Computer Vision and Image Understanding (81)3:231-268, 2001, and references cited in these articles. Further non-limiting examples are found in U.S. Pat. No. 7,139,411, US 2009/0041297 and U.S. Pat. No. 8,131,011, and references cited therein.

Step 202 may result in a count of individuals in the current image, or a location for each detected individual within the current image. In step 203, position parameters are obtained from the IPS 3 at a time point that approximately matches the time point when the current image was captured by the camera 2. As noted above, the position parameters are exclusively provided for authorized individuals. In step 204, the position parameter(s) obtained in step 203 are analyzed to detect unauthorized individuals among the individuals detected in the current image by step 202.

In a first example, step 204 analyzes the position parameter(s) to determine a count of authorized individuals that are located within the scene and thus should be visible in the current image. Presence of one or more unauthorized individuals in the current image is then simply detected if the count of individuals given by step 202 exceeds the count of authorized individuals given by step 204. Depending on the type of position parameter, it is also conceivable that step 204 determines if one or more authorized individuals is located behind another authorized individual, in the line of sight of the camera 2, to such an extent that step 202 is unlikely to separate these individuals. In this case, step 204 may modify the analysis of the counts accordingly.

In a second example, step 204 determines both presence of unauthorized individuals in the current image and segregates between authorized and unauthorized individuals in the current image. In such an example, the position parameter(s) are analyzed to determine the expected location of each authorized individual in the current image. By comparing the expected locations generated by step 204 with the detected locations generated by step 202, the location of each unauthorized individual in the current image is obtained.

If the position parameters are generated in the form of building coordinates for the authorized individuals, step 204 may determine the number of authorized individuals that are located within the scene by mapping the spatial coordinates for each authorized individual to the extent of the scene in the coordinate system of the building coordinates. Similarly, step 204 may determine the location of authorized individuals within the image by transforming the building coordinates to image coordinates in a coordinate system on the image sensor, e.g. by operating a predefined transformation matrix on the building coordinates.

However, the task of analyzing the position parameters in step 204 may be simplified considerably by use of a tailored IPS 3, as will be described below with reference to FIGS. 5-7.

Figure 3A:
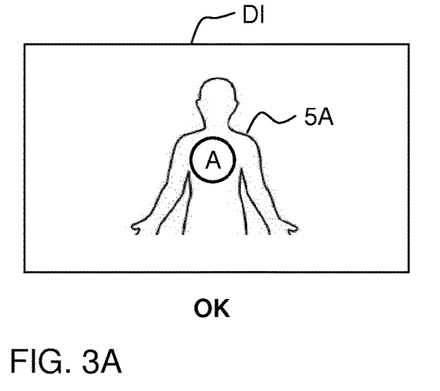
FIGS. 3A-3C represent images taken by the surveillance system in FIG. 1 and illustrate detection of unauthorized individuals within the scene being monitored.
Figure 3B:
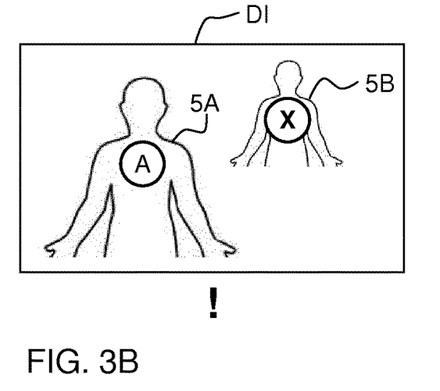
Figure 3C:
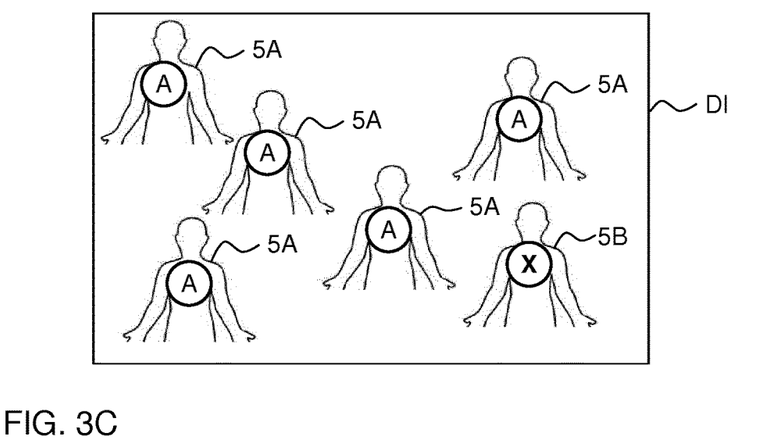

The first and second examples are further illustrated in FIGS. 3A-3C, which are schematic reproductions of digital images DI produced by the camera 2 in FIG. 1. In the images DI, authorized individuals are designated by 5A and indicated by an encircled A, and unauthorized individuals are designated by 5B and indicated by an encircled X.

In FIG. 3A, the image D1 contains only one individual, which is detected by step 202. If step 204, based on the position parameters, determines presence of a single authorized individual within the scene, step 204 will conclude that the individual in the image DI is authorized.

In FIG. 3B, the image D1 contains two individuals, which are detected by step 202. If step 204, in accordance with the first example, determines presence of a single authorized individual within the scene, step 204 will conclude that there is one unauthorized individual 5B in the image DI. However, step 204 will not determine which one of the two individual that are unauthorized. If step 204, in accordance with the second example, determines the location of each authorized individual 5A within the image DI, step 204 is able to determine that the individual to the right in the image DI is unauthorized. It should be understood that step 204 will take into account the fact the image location determined by step 202 generally differs from the image location determined by step 204 for one and the same individual, since the former image location represents the individual whereas the latter image location represents the MD 6 carried by the individual.

The image DI in FIG. 3C depicts six individuals and may be similarly analyzed in view of the position parameters from the IPS 3 to conclude, according to the first example, that one of the individuals in the image DI is unauthorized, or, according to the second example, that the individual at the bottom right corner of the image DI is unauthorized.

It should be understood that the surveillance system may include several cameras 2 which are connected to the control unit 1 and arranged within the building to monitor a respective scene, where the control unit 1 operates according to the method 200 in FIG. 2 to detect unauthorized individuals in the images from each camera 2. Such a distributed arrangement of cameras 2 will make it possible to track the movement of an unauthorized individual through the building. If there is only one unauthorized individual in the images, tracking may be achieved by simply assuming that it is the same unauthorized individual that is detected in images from different cameras. If there are plural unauthorized individuals in the images, tracking may involve discriminating between the different unauthorized individuals by biometric analysis of the images, e.g. by facial recognition analysis, gait analysis, height analysis, etc.

The method in FIG. 2 may include a further step (not shown) of taking dedicated action when step 204 detects presence of one or more unauthorized individuals in the image. One action is to highlight the respective unauthorized individual in the image and provide the thus-highlighted image for display and/or storage. Another action is to store the image, e.g. as a record of the unauthorized individual being present in the building at a specific time. Another action is to start a tracking function to generate a respective movement path within at least part of the building for the unauthorized individual. Another action is to generate a control signal for moving the field of view 4 of the camera 2, e.g. by rotation of a camera head, so as to follow movement of the unauthorized individual. Yet another action is to generate a control signal for causing the camera 2 to zoom in on the unauthorized individual. Any combination of these actions is conceivable. It should be emphasized that the recited actions are merely given as non-limiting examples and that many other actions are conceivable.

Figure 4:
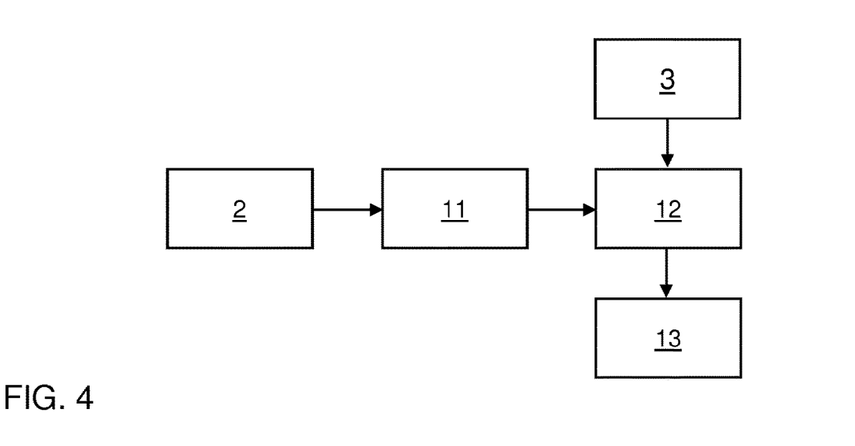
FIGS. 4-5 are block diagrams of surveillance systems according to embodiments of the invention.

FIG. 4 is a block diagram of a surveillance system that is operated according to the method 200 in FIG. 2. The surveillance system includes a camera 2 which is operable to provide images of the scene (cf. 4 in FIG. 1), and an image processing module 11 which is operable to obtain the image according to step 201, process the image for detection of individuals according to step 202 and provide detection data indicative of detected individuals. The surveillance system further includes an IPS 3 that provides the position parameters of authorized individuals, and a surveillance module 12 which is operable to receive the output data of the image processing module 11 and the position parameter(s) from the IPS 3 according to step 203 and process the output data and the position parameter(s) according to step 204. In the example of FIG. 4, the surveillance system further includes an action module 13 which is operable to take dedicated action, e.g. as exemplified above, when the surveillance module 12 detects one or more unauthorized individuals. Referring to FIG. 1, the control unit 1 corresponds to a combination of modules 11, 12 and possibly module 13. In an alternative embodiment, the module 11 is physically combined with the camera 2, and the control unit 1 corresponds to module 12, optionally combined with module 13.

Figure 5:
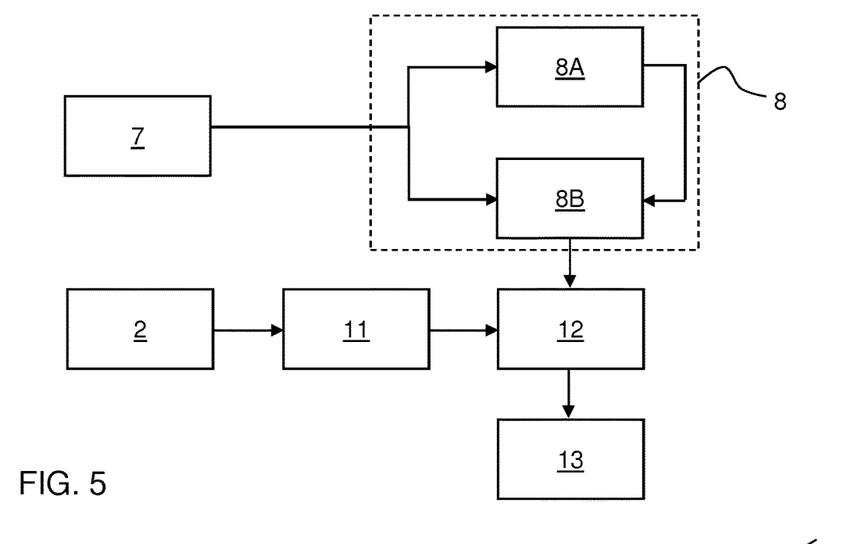

FIG. 5 is a block diagram of a surveillance system with a tailored IPS. For brevity of presentation, the following description will focus on the configuration and operation of the tailored IPS, while all other parts may be assumed to be identical to FIG. 4 unless otherwise stated.

In FIG. 5, the IPS comprises a base station 7 which is configured to receive data transmissions by a radio frequency technique for short-range communication. The following description presumes that the radio frequency technique is based on the Bluetooth™ standard. In such a Bluetooth setting, the base station 7 is configured as a Bluetooth node or beacon placed in a fixed position in the room 100 and with a signal reach that spans the scene monitored by the camera 2 (cf. FIG. 1). Each of the MDs 6 (FIG. 1) is equipped with a Bluetooth interface in order to interact with the base station 7. The MDs 6 are configured to intermittently transmit a signal or data packet for receipt by the signal receiver 7. For at least a subset of the transmissions, the MD 6 encodes a device identifier (ID) in the transmitted signal. The device ID is extracted by the base station 7 and supplied to an authentication sub-module 8A of the positioning module 8. The sub-module 8A compares the device ID to a list of reference IDs for the MDs 6 that are registered with the surveillance system. If the device ID matches a reference ID, the sub-module 8A concludes that the MD 6 is authorized, otherwise the MD 6 is deemed unauthorized.

The foregoing authentication process is simple to implement and requires a minimum of data transfer for authentication. To increase security, e.g. to reduce the risk for replay attacks, the MD 6 may store a circular list of device IDs and rotate through the list as a function of time to transmit different device IDs over time. Provided that the sub-module 8A and the MDs 6 are time-synchronized, the sub-module 8A is able to rotate through circular lists of reference IDs to determine if the received device ID matches a current reference ID in the circular lists. It is to be understood, however, that more advanced authentication techniques may be employed, e.g. by use of cryptographic keys, hash functions, certificates, etc. Such authentication techniques are well-known to the person skilled in the art and will not be described in further detail.

The device ID may but need not be unique to the respective MD 6. One advantage of having unique device IDs is that a particular device ID or list of device IDs may be blocked for use in the surveillance system if an MD 6 is reported stolen or lost. The stolen/lost MD 6 will thereby be deemed unauthorized by the sub-module 8A. It is also conceivable that the surveillance system generates an alert or an alarm signal if a stolen/lost MD 6 is detected by the sub-module 8A.

Another advantage of having unique device IDs is that the surveillance system is able to identify the individual associated with the respective MD 6, if such an association is stored in the surveillance system. The surveillance system may store biometric data for the respective individual, e.g. facial features, height, gait features, etc. Such biometric data may be used to improve the integrity of the surveillance system. For example, the image processing module 11 may be configured to extract biometric data from the image for each detected individual (as part of step 202). The surveillance module 12 may be configured to compare the biometric data from module 11 with the stored biometric data for the individual(s) authorized by sub-module 8A (as part of step 204). If there is a mismatch, the authorization may be revoked and the MD 6 is instead deemed to be unauthorized. Such a procedure may prevent illicit use of stolen/lost MDs 6 for the purpose of deceiving the surveillance system.

The operation of the MD 6 to transmit the signal for receipt by the BS 7 may be controlled by an operating system on the MD 6, or by a dedicated application program ("app") installed on the MD 6. The transmission of the signal may be hidden to the user of the MD 6.

The communication between the MD 6 and the BS 7 may differ depending on Bluetooth protocol. Under Bluetooth protocol version 3 or lower, pairing is necessary to set up a communication channel for data transfer between two Bluetooth-enabled devices. To initiate a pairing, one of the devices (the master) will broadcast "inquiry messages" which will be picked up by the other device (the slave), which will send a response message containing its name, what profiles it supports, and further technical information. With this information, the master continues to complete the pairing to create a piconet. After pairing, the roles of master and slave may be changed between the paired devices. Under Bluetooth protocol version 4, also known as Bluetooth Low Energy (BLE) or Bluetooth Smart, it is not necessary to do a pairing to exchange data. Instead, a "broadcast mode" is supported to allow a Bluetooth-enabled device to send data in an advertisement channel without establishing a connection to another Bluetooth-enabled device. A complementary mode is an "observer mode" which allows a Bluetooth-enabled device to receive data on the advertisement channel. In embodiments of the invention, the MD 6 is suitably operated in broadcast mode to transmit the device ID, and the BS 7 is operated in observer mode. BLE enables a faster data transmission from the MD 6 to the BS 7. It is also possible to let BLE remain active on the MD 6 even if the user disables Bluetooth communication.

Returning to FIG. 5, the positioning module 8 further includes a position determination sub-module 8B, which determines the above-mentioned position parameter based on signal transmission between the MD 6 and the BS 7. Sub-module 8B outputs a position parameter for each MD 6 that is authorized by sub-module 8A. Preferably, sub-module 8B only determines the position parameter for these MDs 6.

In one example, sub-module 8B determines or estimates the distance from the BS 7 to the respective communication device 6. The distance may be determined based on a signal parameter made available by the Bluetooth protocol, such as Received Signal Strength Indicator (RSSI), Link Quality (LQ), Transmitted Power Level (TPL) and Inquiry Response Rate (IRR), which all are available in Bluetooth version 3 or lower. In Bluetooth version 4, at least RRSI is available. It is also conceivable that the sub-module 8B is configured to determine the distance by time-of flight (TOF) measurement or time difference of arrival (TDOA) measurement based on transmitted and received signals. All of these techniques for distance determination are well-known in the art and will not be further described herein.

In another example, sub-module 8B determines presence of MDs 6 within the signal range. Basically, this means that sub-module 8B signals presence of all MDs 6 that are authorized by sub-module 8A.

In a further example, sub-module 8B determines a direction between the BS 7 and the respective MD 6. The direction may be given in relation to a reference axis of the BS 7. Sub-module 8B may determine the direction by processing transmitted signals by an algorithm for determination of angle-of-arrival (AoA), i.e. the angle of incidence at which signals from an MD 6 arrive at the BS 7. AoA determination requires the BS 7 to contain an antenna array. As is known in the art, AoA determination may involve measuring the TDOA between individual elements of the antenna array, and calculating the AoA from these delays. Equivalently, the AoA may be calculated from measured phase differences between antenna elements.

It should be understood that sub-module 8B may generate the position parameter to represent both distance and direction.

Although the description of FIG. 5 has been given for Bluetooth technology, it is equally applicable to other techniques for wireless short-range communication, such as Wi-Fi.

The design and operation of the surveillance system may be simplified by clever placement and configuration of the BS 7. For example, a single BS 7 may be sufficient if the BS 7 is placed in close proximity of the camera 2. For example, the BS 7 may be a unit attached to the exterior of the camera 2, or a component (e.g. a chip) installed inside the camera 2. A few examples will be given with reference to FIGS. 6A-6D, which are top plan views of an authorized individual 5A which is located within the scene of a camera 2. FIGS. 6A-6D also illustrate the radiation lobe 14 of the antenna in the BS 7. The radiation lobe 14 is the region of signal propagation to and from the antenna. The boundaries of the radiation lobe 14 may be defined as having a fraction of the peak effective radiated power of the radiation lobe 14, typically 50%.

Figure 6A:
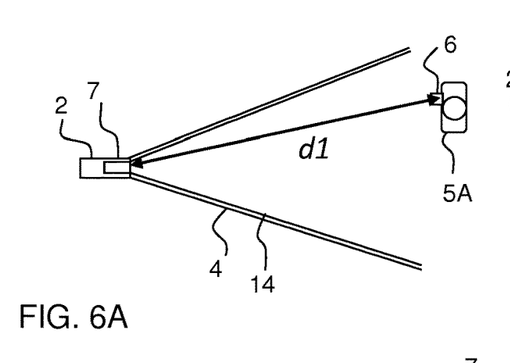
FIGS. 6A-6D are top plan views that show examples of surveillance systems and position parameters that are computed and used by the respective surveillance system.

In FIG. 6A, the BS 7 is co-located with the camera 2 and has a directional antenna with a cone-shaped radiation lobe 14 that essentially overlaps (coincides with) the field of view 4 of the camera 2. In this example, the sub-module 8B generates the position parameter to either indicate presence of an authorized MD 6 (and thereby an authorized individual), or define a distance to an authorized MD 6. For both of these position parameters, the surveillance module 12 is able to obtain a count of the number of authorized individuals within the scene. The distance d1 may also allow the surveillance module 12 to identify a location of the authorized individual within the image, e.g. by analyzing the height of the individuals detected by the image processing module 11.

Figure 6B:
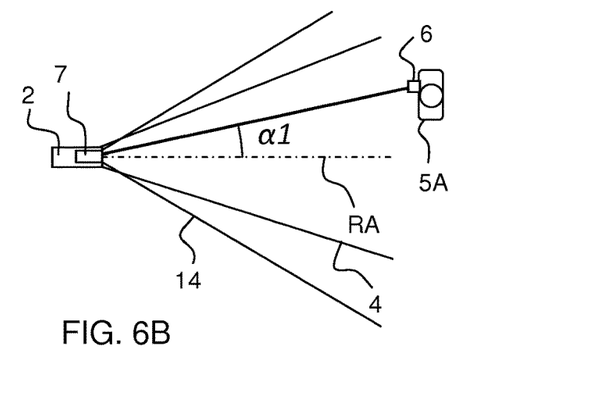

In FIG. 6B, the BS 7 is co-located with the camera 2. Although the BS 7 is illustrated to generate a cone-shaped radiation lobe 14, which implies a directional antenna, the BS 7 may alternatively have an omni-directional antenna. In the illustrated example, the sub-module 8B generates the position parameter to define a direction α1 between the BS 7 and the MD 6 in relation to a known reference axis RA of the BS 7. It is understood that it is a simple task for the surveillance module 12 to map the direction α1 to a location in the image and thus to estimate the location of the authorized individual in the image. Provided that the surveillance module 12 knows the field of view 4 of the camera 2, it is able to ignore position parameters that define directions α1 which fall outside the field of view 4. The added complexity of actively ignoring position parameters is avoided if the radiation lobe 14 essentially overlaps (coincides with) the field of view 4.

Figure 6C:
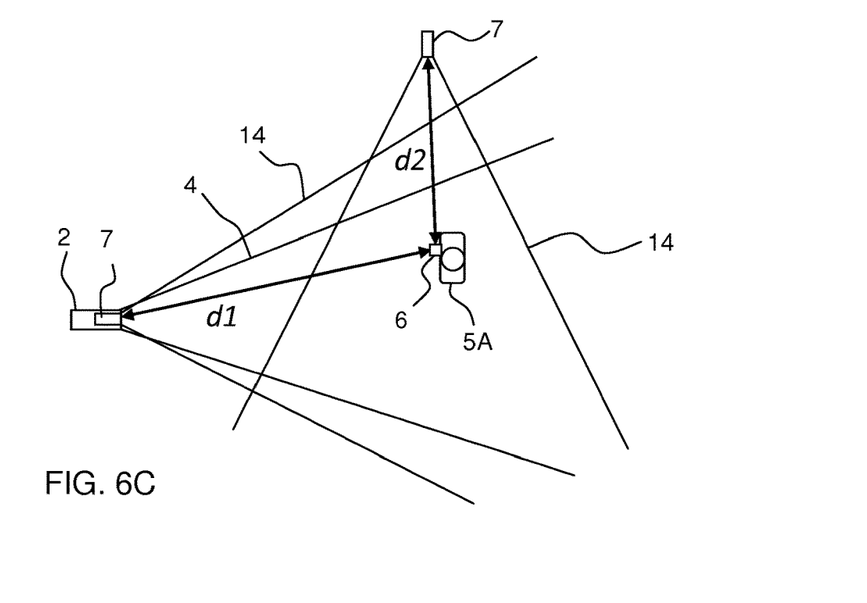

FIG. 6C illustrates a variant where the BS 7 at the camera 2 ("first BS") is supplemented by a second BS 7 spaced from the camera 2. The second BS 7 generates a cone-shaped radiation lobe 14 that overlaps at least part of the cone-shape radiation lope 14 of the first BS 7. The second BS 7 is also connected to the position module 8 (FIG. 5), which determines two distances d1, d2 to each authorized MD 6. This will improve the ability of the surveillance module 12 to determine a location of the MD 6 within the scene, by trilateration, and thus the location of the authorized individual in the image. One or more additional BSs 7 may be installed to further improve the accuracy of the trilateration.

Figure 6D:
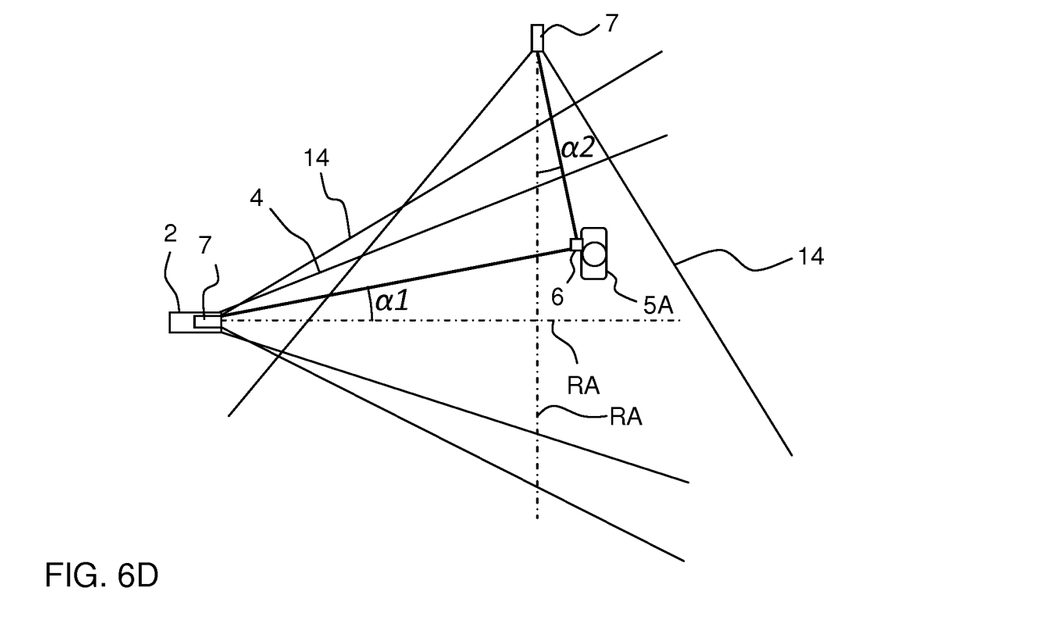

FIG. 6D corresponds to FIG. 6C and differs in that the position module 8 (FIG. 5) determines two directions α1, α2 to each authorized MD 6. The surveillance module 12 processes the directions α1, α2 by triangulation to determine the location of the MD 6 within the scene with improved accuracy. One or more additional BSs 7 may be installed to further improve the accuracy of the triangulation.

Figure 7:
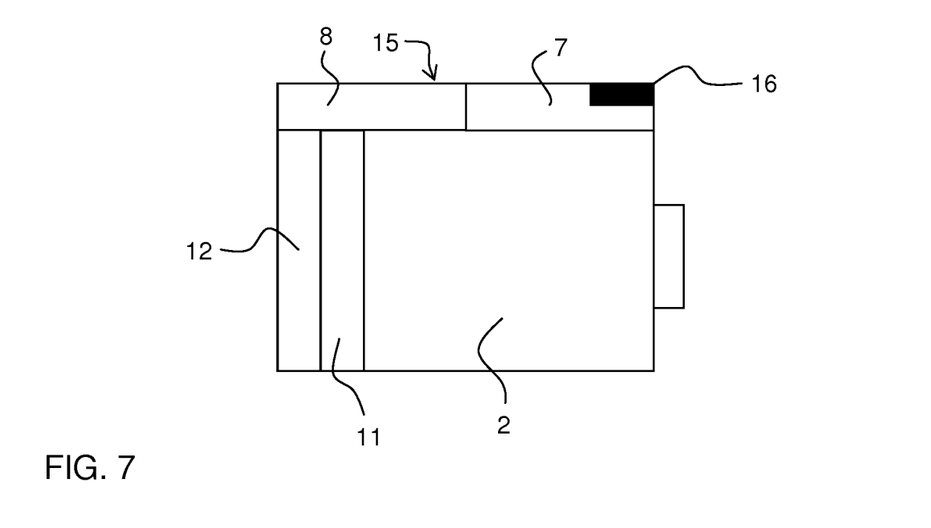
FIG. 7 is a side view of a surveillance system implemented as a unitary device.

FIG. 7 is a side view of a unitary device 15, which combines the camera 2, the BS 7 (including an antenna 16), the positioning module 8, the image processing module 11 and the surveillance module 12. Such a unitary device 15 is simple to install and may be operated to autonomously detect presence of unauthorized individuals within the scene monitored by the camera 2. A plurality of such devices 15 may be installed in a building and connected to a master controller which may operate on data from the devices 15 to track unauthorized individuals within the building. The provision of a unitary device 15 facilitates the task of ensuring that the radiation lobe 14 of the BS 7 overlaps the field of view 4 of the camera 2, if desired.

In one variant, which is applicable to all embodiments described herein, the camera 2 is stereoscopic and thereby able to capture three-dimensional images of the scene. This may improve the ability of the image processing module 11 to detect individuals in the image. Further, if the image processing module 11 is configured to determine the distance from the camera 2 to each detected individual in the image, this distance may be matched to distances provided by the positioning module 8 when the surveillance module 12 determines the location of unauthorized individuals in the image.

It is conceivable to improve the certainty of detecting unauthorized individuals by mounting two or more cameras 2 to monitor the same part of the room 100 and jointly analyze the resulting detection of unauthorized individuals for the respective camera 2.

As a further variant, the sub-module 8B may be located inside the MD 6, such that the position parameter is determined locally by the MD 6, based on signal transmission between the base station 7 and the MD 6, and then sent to the base station 7 from the MD 6 for supply to the surveillance module 12. Sub-module 8A may also be located within the MD 6, but is preferably part of the stationary infrastructure and located in the positioning module 8.

It is furthermore conceivable that the above-mentioned position parameter is obtained from an outdoor positioning system of any kind, including a satellite navigation system such as GPS (Global Positioning System), Assisted GPS (A-GPS), GLONASS, or the like.

The invention claimed is:

1. A surveillance system, comprising:
    a camera unit configured to generate a digital image of a scene at a venue visited by individuals that are either authorized individuals or unauthorized individuals, the authorized individuals having a respective communication device configured to send authorized data transmissions,
    a base station configured to receive data transmissions generated by communication devices located at said venue, said data transmissions including the authorized data transmissions,
    a positioning module configured to determine a position parameter of the respective communication device with respect to the base station based on a respective authorized data transmission,
    an image processing module configured to process the digital image for detection of one or more of the individuals in the digital image, and
    a surveillance module configured to detect presence of one or more of the unauthorized individuals in the digital image as a function of said one or more of the individuals detected by the image processing module and the position parameter determined by the positioning module,
    wherein the position parameter comprises one or more of a distance from the base station to the respective communication device within the scene or a direction from the base station to the respective communication device,
    wherein the surveillance module is further configured to, based on the one or more of the distance from the base station to the respective communication device within the scene or the direction from the base station to the communication device, discriminate the one or more individuals detected in the digital image into the authorized individuals or the unauthorized individuals.

2. The surveillance system of claim 1, wherein the surveillance module is configured to determine, based on the position parameter, a first count of authorized individuals located in the scene, determine a second count of said one or more individuals detected in the digital image, and compare the first and second counts to detect the presence of the one or more unauthorized individuals in the digital image.

3. The surveillance system of claim 2, wherein the surveillance module is configured to detect presence of the one or more of the unauthorized individuals in the digital image if the second count exceeds the first count.

4. The surveillance system of claim 1, wherein the position parameter further comprises a presence of the respective communication device within the scene.

5. The surveillance system of claim 1, wherein the base station is configured to receive data transmissions generated by communication devices located within the scene.

6. The surveillance system of claim 1, wherein the base station is located in proximity of the camera unit.

7. The surveillance system of claim 1, wherein the base station comprises a directional antenna which is configured with a radiation lobe that is substantially equal to and overlaps a field of view of the camera unit.

8. The surveillance system of claim 1, wherein the positioning module is configured to process said data transmissions to identify the authorized data transmissions.

9. The surveillance system of claim 8, wherein the positioning module is configured to identify the authorized data transmissions by extracting, from the data transmissions, a device identifier uniquely associated with the respective communication device, and compare the device identifier with a reference identifier.

10. The surveillance system of claim 1, wherein the camera unit, the base station, the positioning module and the image processing module are combined into a unitary device.

11. The surveillance system of claim 10, wherein the surveillance module is combined with the unitary device.

12. The surveillance system of claim 1, wherein the surveillance module is further configured to, when detecting the presence of one or more unauthorized individuals in the digital image, perform a surveillance action.

13. A computer-implemented method for camera-based surveillance, comprising:
    receiving, from a camera unit, a digital image of a scene at a venue visited by individuals that are either authorized individuals or unauthorized individuals,
    obtaining, from a positioning system, a respective position parameter for one or more of the authorized individuals located at the venue,
    processing the digital image for detection of one or more of the individuals in the digital image,
    detecting presence of one or more of the unauthorized individuals in the digital image as a function of said one or more of the individuals detected in the digital image and the respective position parameter for the one or more of the authorized individuals, wherein the position parameter comprises one or more of a distance from a base station to a respective communication device within the scene or a direction from the base station to the communication device, and
    based on the one or more of the distance from the base station to the respective communication device within the scene or the direction from the base station to the communication device, discriminating the one or more individuals detected in the digital image into the authorized individuals or the unauthorized individuals.

14. A non-transitory computer-readable medium comprising computer instructions which, when executed by a processor, cause the processor to perform the method of claim 13.

15. A control unit configured to perform the method of claim 13, further comprising a signal interface for receiving the digital image from the camera unit and the respective position parameter from the positioning system.

16. A surveillance system, comprising:
- a camera unit configured to generate a digital image of a scene at a venue visited by individuals that are either authorized individuals or unauthorized individuals,
- a positioning system configured to generate a position parameter for one or more of the authorized individuals located at the venue, and
- a control unit according to claim 15.

17. The surveillance system of claim 16, wherein at least part of the positioning system is combined with the camera unit into a unitary device.

* * * * *